United States Patent [19]

Kopetzky

[11] Patent Number: 5,285,982
[45] Date of Patent: Feb. 15, 1994

[54] BELT RETRACTOR WITH TENSION RELIEF FOR SAFETY BELT RESTRAINING SYSTEMS IN VEHICLES

[75] Inventor: Robert Kopetzky, Mutlangen, Fed. Rep. of Germany

[73] Assignee: TRW Repa GmbH, Alfdorf, Fed. Rep. of Germany

[21] Appl. No.: 978,901

[22] Filed: Nov. 19, 1992

[30] Foreign Application Priority Data

Nov. 21, 1991 [EP] European Pat. Off. ........ 91119838.0

[51] Int. Cl.⁵ ............................................... B60R 22/44
[52] U.S. Cl. ................................. 242/107; 242/107.5
[58] Field of Search ............... 242/107, 107.5, 107.6; 280/806, 807

[56] References Cited

U.S. PATENT DOCUMENTS

| | | | |
|---|---|---|---|
| 4,026,494 | 5/1977 | Tanaka | 242/107 |
| 4,084,764 | 4/1978 | Mögerlein et al. | 242/107.4 R X |
| 4,108,393 | 8/1978 | Henderson | 242/107.4 R X |
| 4,125,231 | 11/1978 | Henderson | 242/107.4 R X |
| 4,183,476 | 1/1980 | Föhl | 242/107 |
| 4,216,922 | 8/1980 | Weman | 242/107 |
| 4,228,968 | 10/1980 | Jahn | 242/107 |
| 4,456,196 | 6/1984 | Takada et al. | 280/807 X |
| 4,907,757 | 3/1990 | Rumpf et al. | 280/807 X |
| 5,131,594 | 7/1992 | Refior et al. | 242/107 |

*Primary Examiner*—Daniel P. Stodola
*Assistant Examiner*—John P. Darling
*Attorney, Agent, or Firm*—Tarolli, Sundheim & Covell

[57] ABSTRACT

For tension relief in comfort operation of a belt retractor for safety belt restraining systems in vehicles an auxiliary spring (42) is provided which is selectively connectable parallel to the retracting spring (30) but with opposite effect. The auxiliary spring (42) is connected with its outer end to the outer periphery of a ratchet wheel (38) which can be selectively locked by a pawl, and with its inner end via an overrunning clutch (44) is connected to a shaft (36) which is non-rotatably connected to the belt spool (22). The overrunning clutch (44) permits a relative rotation between the end of the auxiliary spring (42) connected thereto and the belt spool (22) only in the unwinding direction of the latter. The changeover between normal and reduced retracting force takes place without any shock or noise whatever.

5 Claims, 2 Drawing Sheets

BELT RETRACTOR WITH TENSION RELIEF FOR SAFETY BELT RESTRAINING SYSTEMS IN VEHICLES

The invention relates to a belt retractor with tension relief for safety belt restraining systems in vehicles, comprising a retracting spring effective between the retractor housing and the belt spool receiving the webbing, a selectively lockable ratchet wheel rotatable relatively to the belt spool and an auxiliary spring which with its first end is connected to the ratchet wheel and in the locked state of the ratchet wheel is effective between the belt spool and ratchet wheel.

A belt retractor of this type is known for example from U.S. Pat. No. 4,989,804. To reduce the belt tension and improve wearing comfort, a ratchet wheel is blocked and a changeover is effected from the retracting spring to a weaker dimensioned auxiliary spring, which in normal retracting operation is functionally in series with the retracting spring. To dampen the shocks which occur on switching between normal retracting force and reduced retracting force, a brake means is required which opposes relative rotation between the ratchet wheel and retractor housing by producing friction.

The invention provides a belt retractor with tension relief which even without employing a brake means permits jolt-free changeover between normal and reduced retracting force.

In the belt retractor according to the invention, the retracting spring acts directly between the housing and belt spool as in usual belt retractors without tension relief. The auxiliary spring engaging the ratchet wheel with its one end is connected to the belt spool with its other end via an overrunning clutch. The overrunning clutch permits relative rotation between the end of the auxiliary spring connected thereto and the belt spool only in the unwinding direction of the belt spool. When the ratchet wheel is locked, the spring forces of the retracting spring on the one hand and the auxiliary spring on the other hand oppose each other so that the force of the retracting spring is reduced by that of the auxiliary spring. For as long as the ratchet wheel is not locked, the auxiliary spring has no effect. On locking of the ratchet wheel, for example by means of an electromagnetic actuating pawl responding to the insertion of the insert tongue into the belt buckle, the auxiliary spring is tensioned by webbing return because the overrunning clutch does not permit any relative rotation in this direction between the belt spool and the end of the auxiliary spring connected to the overrunning clutch. When the auxiliary spring is tensioned it acts parallel to the retracting spring on the belt spool but in the opposite direction so that the retracting force and accordingly the tensile stress in the belt system is reduced. Since the auxiliary spring is gradually tensioned, the change to the reduced belt tension also takes place free of shocks and noise. To change to normal belt tensioning the ratchet wheel is unlocked; the ratchet wheel is then accelerated by the tension of the auxiliary spring and set in rotation until it comes to a standstill after the auxiliary spring has relaxed. This operation also takes place free of shock and noise.

It is apparent that the belt retractor with tension relief according to the invention does not require any special means for avoiding shocks or noises when changing between normal and reduced tension. It can therefore be implemented with very low expenditure.

A particularly compact constructional form is obtained if in accordance with a preferred embodiment the auxiliary spring is arranged axially adjacent the retracting spring and radially within an externally toothed rim of the ratchet wheel and the overrunning clutch is mounted radially within the auxiliary spring on a shaft which is connected non-rotatably to the belt spool and which has a lateral entraining extension on which the radially inner end of the retracting spring engages.

Further features and advantages of the invention will be apparent from the following description and the drawings, to which reference is made and in which.

Figure 1A:
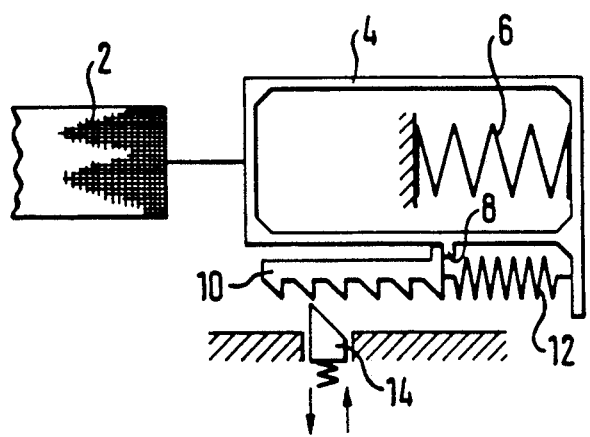
FIGS. 1a and 1b show a basic scheme and a diagram to explain the mode of operation of the belt retractor.

In order to illustrate the basic construction and function of the belt retractor, its essential functional parts are designated in FIG. 1a as if they were linearly movable. The webbing 2 is coupled to the belt spool 4. A retracting spring 6 is effective between the belt spool 4 and the housing. The belt spool 4 carries a laterally projecting driver 8 on which a stop face of a slide 10 provided with ratchet teeth is held in engagement by a tension spring 12. A detent pawl 14 selectively displaceable transversely of the movement direction of the slide 10 cooperates with the ratchet teeth of said slide 10. In the state shown in FIG. 1a the tension spring 12 has no effect on the belt spool 4; only the retracting spring 6 is operative and is assumed to be a pressure spring. When the detent pawl 14 is engaged into the ratchet teeth of the slide 10 the latter is held fixed with respect to the housing. During retracting of webbing the tension spring 12 is tensioned. It opposes the pressure spring 6 so that the resulting retracting force is reduced. When the detent pawl 14 has moved out of the ratchet teeth of the slide 10, the tension spring 12 relaxes and sets the slide 10 in movement until it is brought to a standstill by friction.

Figure 1B:
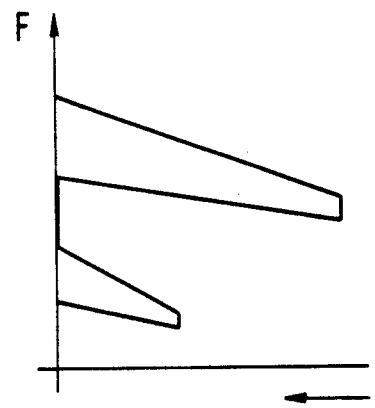

FIG. 1b shows on the ordinate the effective retracting force and on the abscissa the webbing withdrawal length.

Figure 2:
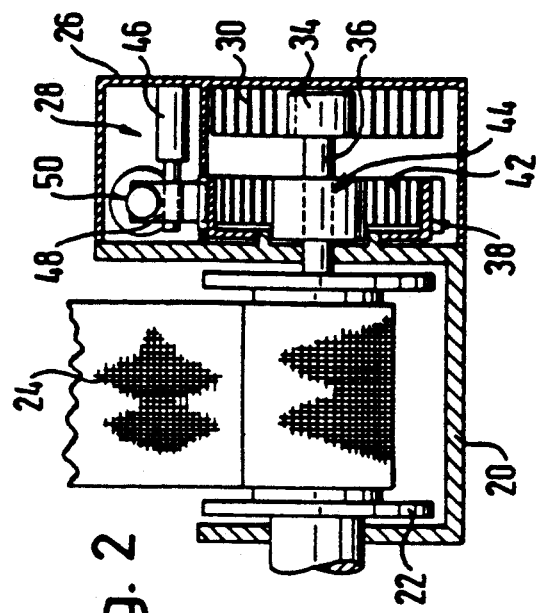
FIG. 2 is a schematic axial section of an embodiment of the belt retractor.
Figure 3:
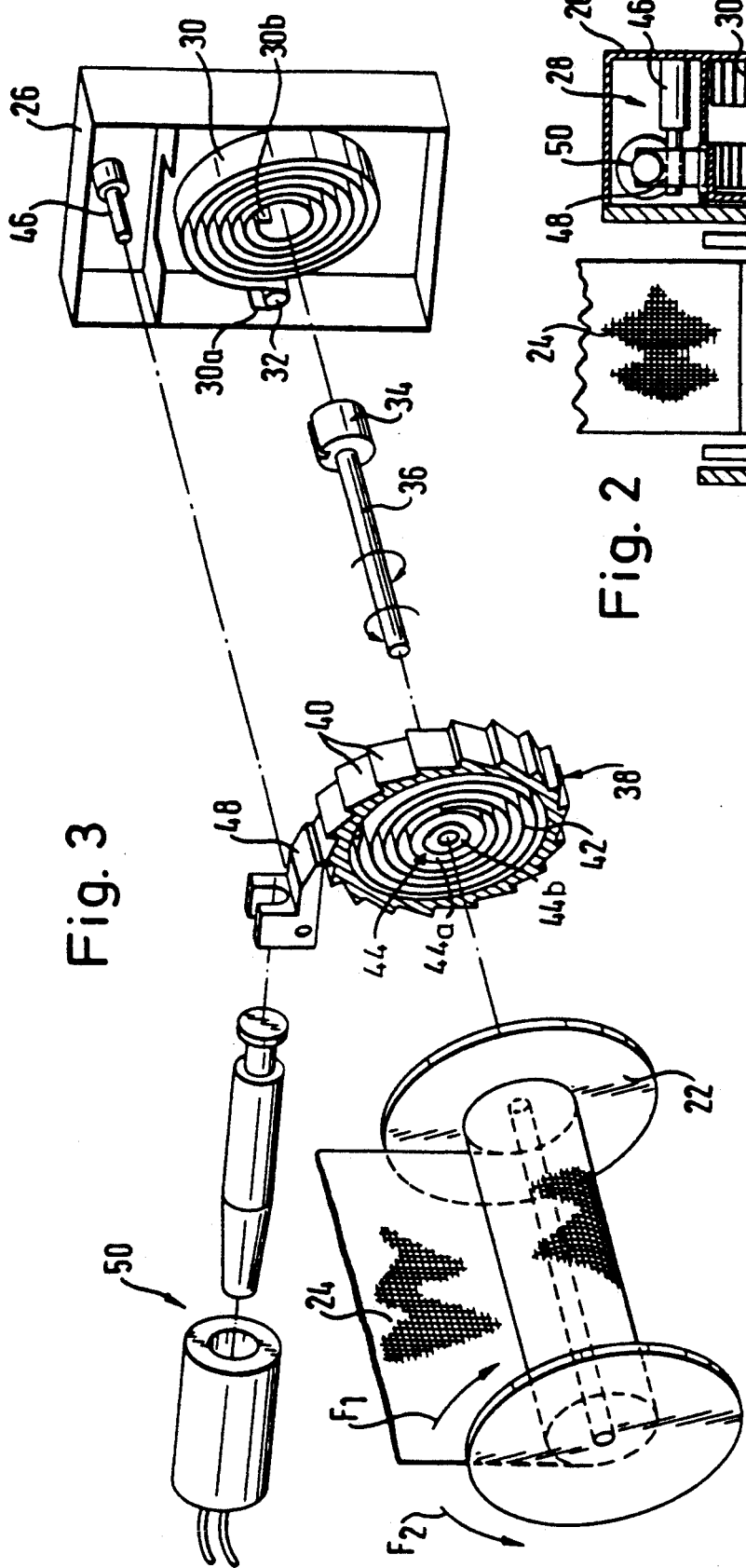
FIG. 3 is a schematic exploded view of the belt retractor according to FIG. 2.

The embodiment of a belt retractor with tension relief illustrated schematically in FIGS. 2 and 3 comprises in a U-shaped loadbearing housing 20 a rotatably mounted belt spool 22 on which the webbing 24 is coiled. On the left side in FIG. 2 the belt spool 22 is connected to a conventional vehicle-sensitive and/or webbing-sensitive blocking mechanism, which is not illustrated. On the opposite side of the belt spool, in the interior of a cap 26 placed on the adjacent side wall of the housing 20 a retracting mechanism is disposed which is denoted generally by 28. A spiral retracting spring 30 is connected with its outer end 30a to a pin 32 connected to the cap 26 and with its inner end 30b engages into a slot at the outer periphery of a cylindrical driver extension 34 at the free end of a shaft 36 which is non-rotatably connected to the belt spool 22. A ratchet wheel 38 is mounted rotatably about said shaft 36 and consists of a radial disc and an externally toothed gear rim 40 which projects from the outer periphery of the disc axially perpendicularly towards the side of the retracting spring 30. A spiral auxiliary spring 42 is arranged radially within the gear rim 40. The auxiliary spring 42 is connected with its outer end to the gear rim 40. With its inner end it is connected to the radially outer ring 44a of an overrunning clutch 44, the radially inner ring 44b of which is mounted non-rotatably on the shaft 36. The overrunning clutch 44 permits relative rotation between the shaft 36 and the end of the auxiliary spring 42 connected thereto only in the unwinding direction of the belt spool; in the opposite direction it establishes a rigid connection between the belt spool 22 or shaft 36 and the inner end of the auxiliary spring 42 so that the tension generated by the auxiliary spring 42 can act on the belt spool 22. A detent pawl 48 mounted pivotally on a pin 46 on the cap 26 cooperates with the ratchet teeth of the toothed rim 40 in order to selectively block the ratchet wheel 38. The detent pawl 48 is actuated by an electromagnet 50 which for example is controllable by a switch contact in the buckle of the safety belt system.

As in a conventional belt retractor without tension relief the retracting spring 30 is permanently operative between the cap connected to the housing 20 and the belt spool 22. For as long as the detent pawl 48 is disengaged from the teeth of the gear rim 40, the ratchet wheel 38 remains freely rotatable. The auxiliary spring 42 has no effect whatever. When the belt is fastened, firstly the webbing 24 is uncoiled from the belt spool 22 in the direction of the arrow $F_1$ in FIG. 3. By locking the insert tongue in the belt buckle or by some other control criterion, the electromagnet 50 is activated to bring the pawl 48 into engagement with the ratchet teeth of the gear rim 40 and lock the ratchet wheel 38 with respect to the housing. If webbing is now coiled up again, the belt spool 22 rotates in the direction of the arrow $F_2$ of FIG. 3. This corresponds to a rigid connection between the belt spool and auxiliary spring 42 in which the overrunning clutch 44 engages so that the auxiliary spring 42, the outer end of which is connected to the ratchet wheel 38 held non-rotatable and the inner end of which is entrained via the overrunning clutch 44, is tensioned by the rotation of the belt spool 22. The force generated in the tensioned state by the auxiliary spring 42 and transmitted via the overrunning clutch 44 to the belt spool 22 opposes the force generated by the retracting spring 30 so that the resultant retracting force is correspondingly reduced Since the tensioning of the auxiliary spring 42 takes place gradually, neither shock effects nor disturbing noises occur. The tension relief is now active; due to the reduced belt tension the wearing comfort is considerably increased.

To reestablish the undiminished retracting force, for example initiated by opening the buckle, the detent pawl 48 is disengaged; the now freely rotatable ratchet wheel 38 is accelerated by the tensioned auxiliary spring 42 until the latter has relaxed The ratchet wheel 38 finally comes to rest due to friction. Since the acceleration of the ratchet wheel 38 by the auxiliary spring 42 is not an abrupt process either, a smooth change is made from the reduced back to the unreduced retracting force No disturbing noises whatever occur In the belt retractor described the tension relief is achieved with few components which are cheap and easy to assemble. By avoiding a brake means, friction losses and tolerance dependence are also avoided. Further avoided are pawl-engagement noises as occur in other known mechanisms due to the fact that on webbing withdrawal, as is necessary for activating the tension relief, the spring-loaded detent pawl is deflected by the ratchet teeth of the entrained ratchet wheel onto the ramp faces of the teeth and then comes back again.

What is claimed is:
1. A safety belt retractor for vehicles comprising:
   a housing;
   a belt spool rotatably mounted in said housing for coiling and uncoiling of belt webbing;
   a retracting spring for biasing said belt spool relative to said housing;
   a selectively lockable ratchet wheel rotatable relative to said belt spool, said ratchet wheel having a locked condition in which rotation of said ratchet wheel relative to said housing is prevented;
   an auxiliary spring having a first end connected to said ratchet wheel; and
   an overrunning clutch means for selectively causing a second end of said auxiliary spring to rotate with said belt spool;
   said overrunning clutch permitting relative rotation between said second end of said auxiliary spring and said belt spool only in an uncoiling direction of said belt spool; and
   said auxiliary spring, during the locked condition of said ratchet wheel, providing a means for biasing said belt spool relative to said housing in a direction opposite to the bias of said retracting spring.

2. A retractor as set forth in claim 1, wherein said auxiliary spring is a coil spring arranged coaxially to said retracting spring.

3. A retractor as set forth in claim 1, wherein said ratchet wheel has an externally toothed gear rim and said auxiliary spring is a coil spring arranged radially within said gear rim.

4. A retractor as set forth in claim 3, wherein said overrunning clutch means is arranged radially within said auxiliary spring and has a radially outer input member and a radially inner output member, said input member being connected to said second end of the auxiliary spring and said output member being connected to a shaft for joint rotation with said shaft, and said shaft being in turn connected to said belt spool for joint rotation therewith.

5. A retractor as set forth in claim 3, wherein said shaft has an axially extended end carrying an engagement member, said retracting spring having a radially inner end connected to said engagement member and a radially outer end connected to said housing.

* * * * *